US009727781B2

(12) United States Patent
Wooldridge

(10) Patent No.: US 9,727,781 B2
(45) Date of Patent: Aug. 8, 2017

(54) MACHINE VISION VERIFICATION

(71) Applicant: DATACARD CORPORATION, Minnetonka, MN (US)

(72) Inventor: Cory Wooldridge, Minnetonka, MN (US)

(73) Assignee: Entrust Datacard Corporation, Shakopee, MN (US)

( * ) Notice: Subject to any disclaimer, the term of this patent is extended or adjusted under 35 U.S.C. 154(b) by 371 days.

(21) Appl. No.: 14/068,407

(22) Filed: Oct. 31, 2013

(65) Prior Publication Data

US 2014/0119616 A1 May 1, 2014

Related U.S. Application Data

(60) Provisional application No. 61/720,521, filed on Oct. 31, 2012.

(51) Int. Cl.
*G06K 7/10* (2006.01)
*G06K 9/00* (2006.01)
(Continued)

(52) U.S. Cl.
CPC ....... *G06K 9/00463* (2013.01); *G06K 9/2036* (2013.01); *G07D 7/00* (2013.01); *H04N 1/00* (2013.01)

(58) Field of Classification Search
CPC .... G06K 7/10; G06K 9/00463; G06K 9/2036; G07D 7/00
(Continued)

(56) References Cited

U.S. PATENT DOCUMENTS 5,481,095 A     1/1996   Mitsuda et al.
7,874,487 B2 *  1/2011   Nunnink ............ G06K 7/10732
                                                    235/455
(Continued)

FOREIGN PATENT DOCUMENTS

CN     101608780    12/2009
EP      1830305      9/2007
(Continued)

OTHER PUBLICATIONS

"A Practical Guide to Machine Vision Lighting—Part III", National Instruments, (Jan. 8, 2010) 4 pages.
(Continued)

*Primary Examiner* — Daniel Hess
(74) *Attorney, Agent, or Firm* — Hamre, Schumann, Mueller & Larson, P.C.

(57) ABSTRACT

Embodiments of systems and methods for directly reading and verifying characters on a personalized document, are provided. A surface of the personalized document is illuminated independently or simultaneously by first and second light sources. The first light source has a ring shape, surrounds the personalized document in 360 degree, and transmits a grazing incident light to illuminate the surface of the personalized document. An incident light from the second light source is reflected by a beam splitter and illuminates the surface of the personalized document in a direction generally perpendicular to the surface. Light reflected from the surface of the personalized document in a direction generally perpendicular to the surface thereof is collected by a camera.

10 Claims, 7 Drawing Sheets

(51) Int. Cl.
*G07D 7/00* (2016.01)
*G06K 9/20* (2006.01)
*H04N 1/00* (2006.01)

(58) Field of Classification Search
USPC ............. 235/454, 455, 462.45, 462.42
See application file for complete search history.

(56) References Cited

U.S. PATENT DOCUMENTS

| | | | | |
|---|---|---|---|---|
| 7,886,979 | B2* | 2/2011 | Lei | G06K 7/10722 235/454 |
| 8,016,199 | B2* | 9/2011 | Nunnink | G06K 7/10732 235/462.01 |
| 2002/0070277 | A1* | 6/2002 | Hannigan | G06F 3/0317 235/462.45 |
| 2002/0136009 | A1 | 9/2002 | Yoneda | |
| 2005/0007776 | A1 | 1/2005 | Monk et al. | |
| 2011/0150346 | A1 | 6/2011 | Panetta | |

FOREIGN PATENT DOCUMENTS

| | | |
|---|---|---|
| JP | 6-195451 | 7/1994 |
| JP | 2001-043311 | 2/2001 |
| JP | 2007-11653 | 1/2007 |
| KR | 20-0183189 | 5/2000 |
| WO | 2010098143 | 9/2010 |

OTHER PUBLICATIONS

"Illumination Basics: Diffuse and Regular Reflection: Identifying Non-glossy and Glossy Objects", Machine Vision Systems, Keyence Corporation, accessed approximately Oct. 30, 2013, www.sensorcentral.com/vision/tech03.php?action=print; 1 page.
International Search Report for PCT/US2013/067812 dated Feb. 18, 2014, 3 pages.
Martin, Daryl, "A Practical Guide to Machine Vision Lighting", Advanced Illumination, (Oct. 2007) 18 pages.
Shedding Light on Machine Vision, Machine Vision Lighting, Technology White Paper, Microscan Systems, Inc., (May 2009) 3 pages.
Wolff, Lawrence B., "Polarization Camera for Computer Vision With a Beam Splitter", J. Opt. Soc. Am. A, vol. 11, Issue 11, (1994) Abstract only, 1 page.
Written Opinion for PCT/US2013/067812 dated Feb. 18, 2014, 3 pages.
The Extended European Search Report issued in European application No. 13852274.3, dated Jul. 7, 2016, total 8 pages.
Office Action issued in European application No. 13852274.3, dated May 18, 2017, total 5 pages.

* cited by examiner

MACHINE VISION VERIFICATION

FIELD OF TECHNOLOGY

The embodiments disclosed herein relate generally to machine vision verification, more particularly to a vision verification system for characters or symbols on a personalized document.

BACKGROUND

In certain applications, embossed and/or indented characters, such as lines, numbers, letters, symbols, etc., on a personalized document, e.g., a credit card, need to be verified or recognized. Prior approaches used include imaging a card using a digital camera and an illumination source such as a Cloudy Day Illuminator (CDI) so that the embossed characters thereof can be verified or recognized by digitizing the image of the embossed card.

SUMMARY

The embodiments described herein relate to systems and methods for directly reading and verifying character(s) on a personalized document such as, for example, a credit card, an identification card, a gift card, a passport, etc. The embodiments provide systems and methods to illuminate the character(s) on the personalized document and directly capture an image of the character(s).

In one embodiment, the light reflected from a perimeter of the characters and that reflected from an inner portion of the characters surrounded by the perimeter, in a direction generally perpendicular to the surface of the personalized document, are different in brightness to provide a contrast. An image of the characters is captured by collecting the reflected light in the direction generally perpendicular to the surface of the personalized document. The captured image is then used to verify and/or recognize the characters on the personalized document. The characters include, for example, lines, numbers, letters, symbols, Braille, etc.

The embodiments described herein utilize at least one light source for illuminating the front side and/or the back side of the personalized document. The embodiments can reliably verify and/or recognize characters on a personalized document even if there are reflections caused by, for example, a metallic background of the personalized document, and/or characters having similar color as the background thereof.

The embodiments described herein can reliably verify and/or recognize any character on a personalized document that has a character size of, for example, 7 or 10 characters per inch (CPI) or even smaller characters. The conventional approaches using CDI may not reliably verify characters having a size of 10 CPI or less.

In addition, the embodiments can determine and analyze location and spacing of the characters to determine whether they meet standards, for example, the ISO 7811-1 standard.

In one embodiment, a vision verification system for directly reading and verifying characters on a personalized document includes at least one light source for illuminating a surface of the personalized document, and a camera for capturing an image of the characters on the surface of the personalized document. The light source is disposed with respect to the personalized document so that only light reflected from the surface of the personalized document in a direction generally perpendicular to the surface thereof is collected by the camera, and that the captured image provides a contrast between the perimeter of the characters and an inner portion of the characters defined by the perimeter.

In another embodiment, a method for directly reading and verifying characters on a personalized document is provided. The method includes illuminating a surface of the personalized document, reflecting, from a perimeter of the characters, a first amount of light in a direction generally perpendicular to the surface of the personalized document, and reflecting, from an inner portion of the characters, a second amount of light in the direction generally perpendicular to the surface of the personalized document. The second amount of light is brighter or darker than the first amount of light to provide a contrast. The reflected light is collected in the direction generally perpendicular to the surface of the personalized document to capture an image of the characters.

BRIEF DESCRIPTION OF THE DRAWINGS

Referring now to the drawings in which like reference numbers represent corresponding parts throughout.

DETAILED DESCRIPTION

The embodiments described herein relate to systems and methods for directly reading and verifying characters on a personalized document such as, for example, a credit card, an identification card, a gift card, a passport, etc. The embodiments provide systems and methods to illuminate the characters on the personalized document and directly capture an image of the characters. The light reflected from a perimeter of the characters and that reflected from an inner portion of the characters surrounded by the perimeter, in a direction generally perpendicular to the surface of the personalized document, are different in brightness to provide a contrast. An image of the characters is captured by collecting the reflected light in the direction generally perpendicular to the surface of the personalized document. The captured image is then used to verify and/or recognize the characters on the personalized document. The characters can include, for example, embossed or indented characters, symbols, Braille, etc.

References are made to the accompanying drawings that form a part hereof, and in which is shown by way of illustration of the embodiments in which the methods and systems described herein may be practiced. The term "personalized document" generally refers to a document having a surface with character(s) thereon that can be captured and recorded in an image. In one embodiment, the personalized document can be a card such as, for example, a credit card, an identification card, a gift card, etc. The card can include a card substrate made of, for example, a plastic material or other suitable materials. The card can also include embossed characters, symbols, Braille, etc., on a surface of the card. When embossing a character, a coloration material can be transferred from a foil onto the character. The card can also include printed material, a hologram(s), a magnetic stripe, an integrated circuit chip, etc. The personalized document can also be a passport or other travel document.

The term "embossed character" refers to a character that is indented from one side of a card and raised above the opposite surface of the card. The term "embossed character" also refers to a character that is indented into one surface of a card without being raised above the opposite surface.

The term "contrast" generally refers to the difference in brightness and/or color that makes an object (or a representation of the object in an image or display) distinguishable.

The term "camera" generally refers to a device that captures and records images. The camera can be a monochrome digital camera, a high resolution digital camera, or any suitable digital or non-digital camera.

Figure 1A:
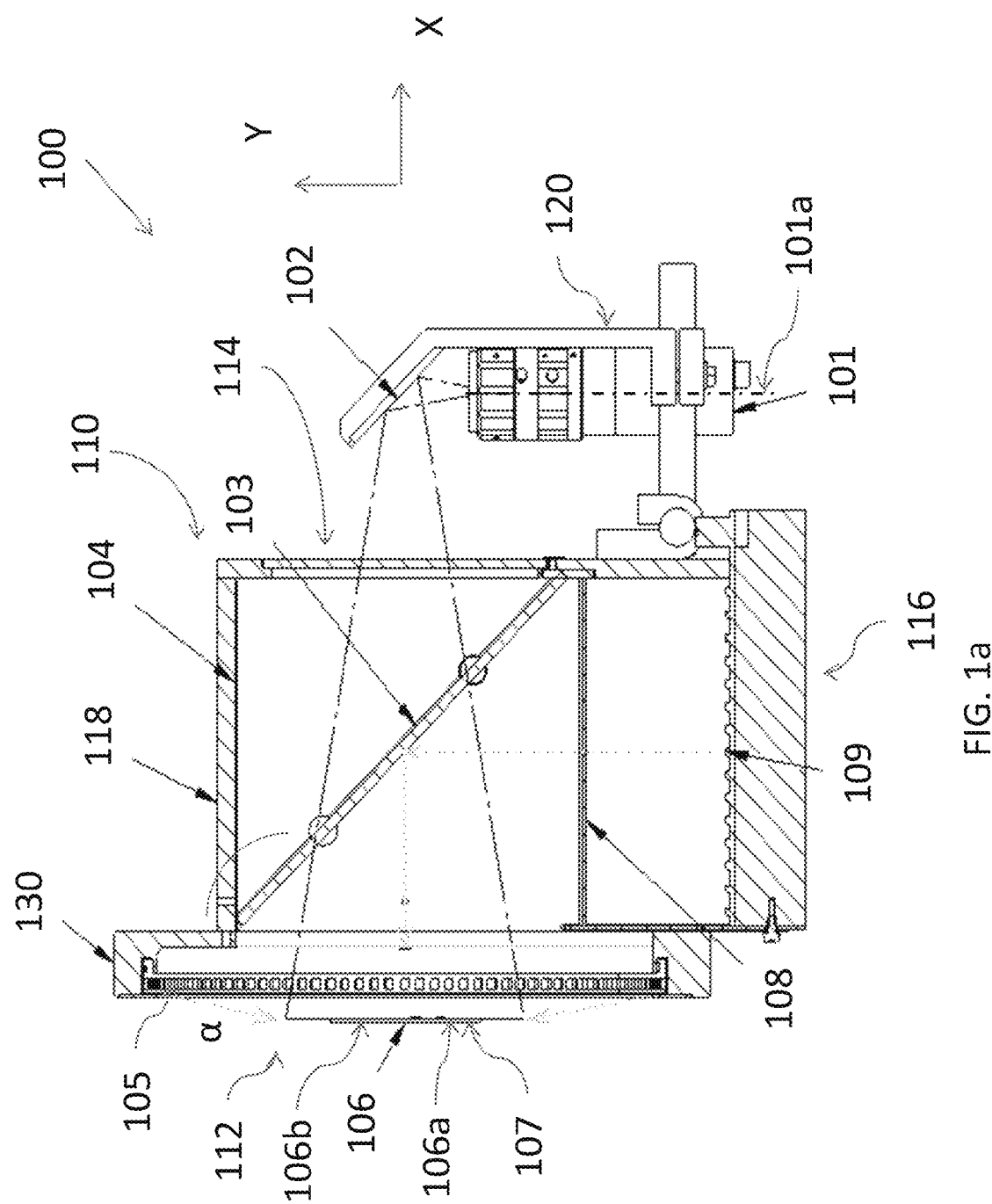
FIG. 1a illustrates a side view of a machine vision verification system, according to one embodiment.
Figure 1B:
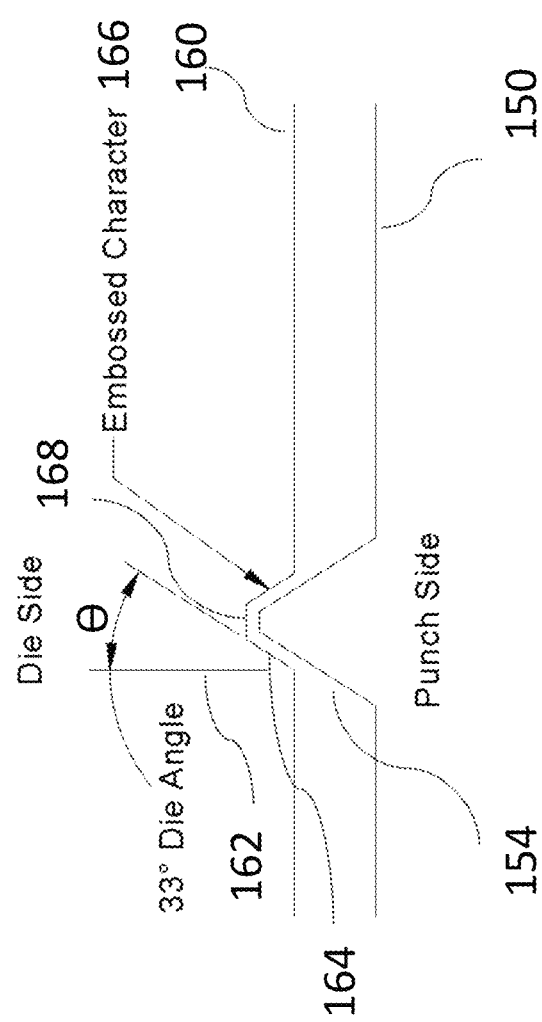
FIG. 1b illustrates a die angle of an embossed character on a card.

FIG. 1 illustrates a system 100 for directly reading and verifying characters 107 on a surface of a card 106. The system 100 includes a box 110 that has a first side 112 and an opposite side 114, a second side 116 and an opposite side 118, and top and bottom sides (not shown). The first side 112 and the opposite side 114 can be open or light transmissive to allow light pass therethrough. The card 106 is disposed facing an X axis, with a front surface 106a facing the first side 112 of the box 110, facing a mirror 102 through the sides 112 and 114. The mirror 102 and a camera 101 are mounted on a bracket 120 fixed on the box 110. The camera 101 has an optical axis 101a generally parallel to a Y axis, or generally parallel to the surface 106a of the card 106. An image of the card 106 is captured and recorded by the camera 101, via the reflection of the mirror 102. In some embodiments, the camera 101 can face the card 106 and the image of the card 106 can be directly captured and recorded by the camera without the mirror 102. It is to be understood that any suitable optical devices for helping the image of the card to be captured by the camera 101 can be used.

A first light source 105 is mounted on a bracket 130 for illuminating the card 106. The first light source 105 surrounds the card 106. In the embodiment of FIG. 1, the first light source 105 has a circular shape. In some embodiments, the first light source can have, for example, a square, polygon, octagon, multifaceted shape, etc. The first light source 105 includes light-emitting diodes (LEDs) that surround the card 106. That is, the LEDs are disposed in a ring shape and each illuminate the surface of the card 106 with grazing incident light so that a 360 degree illumination is provided. The grazing incident light from the first light source 105 forms an angle α with respect to the Y axis that has a range from about 0° to about 45°. In the illustrated embodiment, the angle α is about 25°.

A second light source 109 is disposed on the side 116 of the box 110 for illuminating the card 106. The second light source 109 includes an array of LEDs that emit light through a diffuser plate 108 in a direction generally parallel to the Y axis. The diffused light transmits to a beam splitter 103. The beam splitter 103 is semitransparent and disposed about 45° with respect to the surface of the card 106. A portion of the diffused light is reflected to illuminate the surface 106a of the card 106 in a direction generally opposite the X axis. In one embodiment, about 50% of the diffused light can be reflected. The remaining portion of the diffused light transmits through the beam splitter 103 and is absorbed by the side 118. The side 118 includes a velvety felt like material 104 disposed on the surface thereof to enhance the light absorption. It is to be understood that the first and second light sources can include any suitable light sources other than LED. The light sources can be white light or monochromatic light such as red, green or blue light, or any combinations thereof.

In the embodiment shown in FIG. 1, the characters 107 of the card 106 include embossed characters that are indented from the back surface 106b of the card 106 and raised above the front surface 106a. The raised characters shown on the front surface 106a and the corresponding recessed characters on the back surface 106b are mirrored with each other. On the front surface 106a, the characters 107 each include a perimeter that forms a slope rising to an inner portion or top surface that is raised above the front surface 106a. Correspondingly, on the back surface 106b, the characters 107 each include a perimeter that forms a slope down to an inner portion or bottom surface that is indented below the back surface 106b. The slope forms a die angle of, for example, about 32.5±0.5° with respect to the front or back surface of the card 106.

As shown in FIG. 1a, a die angle refers to a draft angle Θ when forming an embossed character 166 on a card 160 by, for example, indenting the card 160 using a punch 150 having a raised feature 154. The die angle is formed between a slope 164 of the embossed character 166 and a surface normal 162. In one embodiment, the magnitude of the draft angle Θ can be about 33°. However, is to be understood that the draft angle Θ can be values other than 33° as long as the draft angle helps to prevent the punch 150 and the card 160 from sticking together when forming the embossed character 166. It is to be understood that the slope 164 can be a curved surface leading toward a surface 168 of the embossed character 166.

Figure 2A:
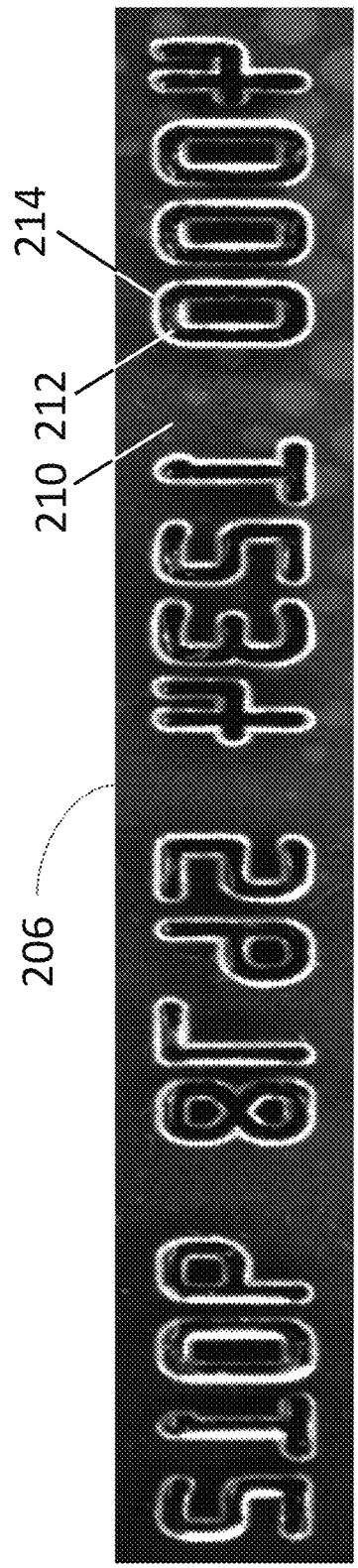
FIG. 2a illustrates an image of a portion of the front side of a card with embossed characters when the card is illuminated by a first light source, according to one embodiment.

Returning to FIG. 1a, the first and second light sources 105, 109 can be used independently or simultaneously for illuminating the characters 107 on the front surface 106a and/or the back surface 106b of the card 106. FIG. 2a illustrates an image 206 of a portion of the front surface 106a of the card 106 captured by the camera 101 when the front surface 106a faces the mirror 102 and the characters 107 on the front surface 106a are illuminated by the first light source 105. The light from the first light source 105 can have an incident angle α, e.g., about 0-45°. With such an incident angle, the incident light on the inner portion or top surface of the raised characters can be reflected away from the direction generally perpendicular to the surface 106a, or reflected away from the X axis, and the reflected light cannot be collected by the camera 101. The front surface 106a of the card 106 that is a background of the characters 107 can also reflect a significant amount of the incident light away from the direction generally parallel to the X axis, and the reflected light cannot be collected by the camera 101. Therefore, there is more light reflected from the perimeter of the characters in the direction generally parallel to the X axis that can be collected by the camera 101 than that reflected from the inner portion or top surface of the characters and the background.

As shown in FIG. 2a, the image 206 includes a portion 210 that corresponds to the background on the front surface 106a of the card 106, a portion 214 that corresponds to the perimeter of the characters 107, and a portion 212 that corresponds to an inner portion or top surface of the characters 107 that is surrounded by the perimeter. The portion 214 corresponding to the perimeter is much brighter than the portion 212 corresponding to the inner portion of the raised characters. A strong contrast is formed between the portion 212 and the portion 214, which can define an image of the raised characters 107 on the front surface 106a of the card 106.

Figure 2B:
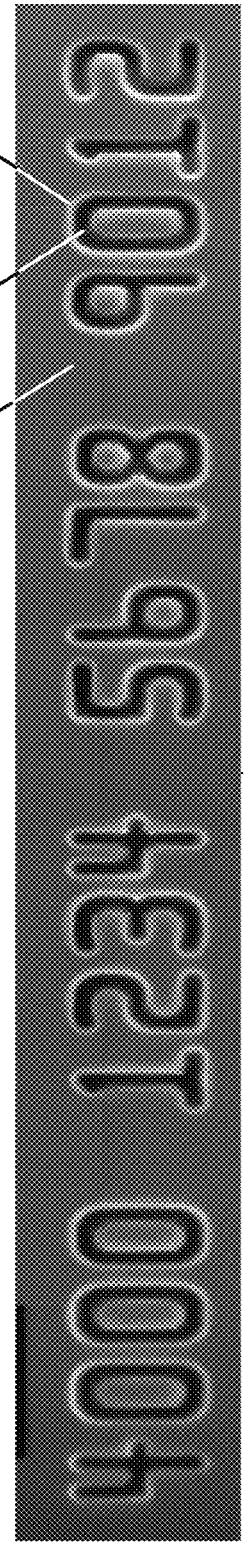
FIG. 2b illustrates an image of the portion of the back side of the card in FIG. 2a when the card is illuminated by the first light source, according to one embodiment.

FIG. 2b illustrates an image 206' of the portion of the back surface 106b of the card 106 captured by the camera 101 when the back surface 106b faces the mirror 102 and the characters 107 on the back surface 106b is illuminated by the first light source 105. The light from the first light source 105 has an incident angle α, e.g., about 0-45°. With such an incident angle, the perimeter of the characters 107 is more illuminated than the recessed inner portion or bottom surface of the characters 107 and the remaining back surface 106b of the card 106 that is a background.

As shown in FIG. 2b, the image 206' includes a portion 210' that corresponds to the background on the back surface 106b of the card 106, a portion 214' that corresponds to the perimeter of the recessed characters 107, and a portion 212' that corresponds to an inner portion or bottom surface of the recessed characters 107 that is surrounded by the perimeter. The portion 214' corresponding to the perimeter is brighter than the portion 212' corresponding to the inner portion of the characters. A strong contrast is formed between the portion 212' and the portion 214', which can define an image of the recessed characters 107 on the back surface 106b of the card 106.

Figure 3A:
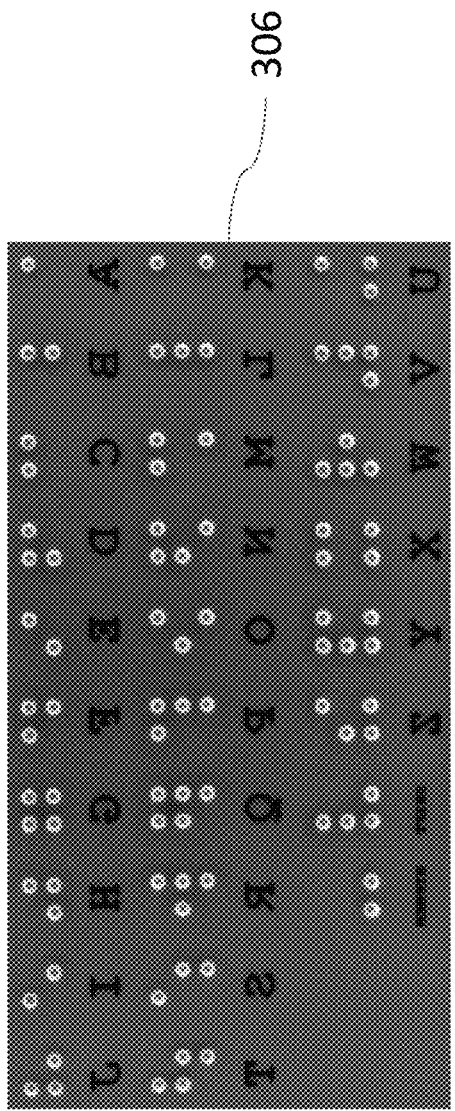
FIG. 3a illustrates an image of a portion of the front side of a card with embossed Braille characters when the card is illuminated by a first light source, according to one embodiment.
Figure 3B:
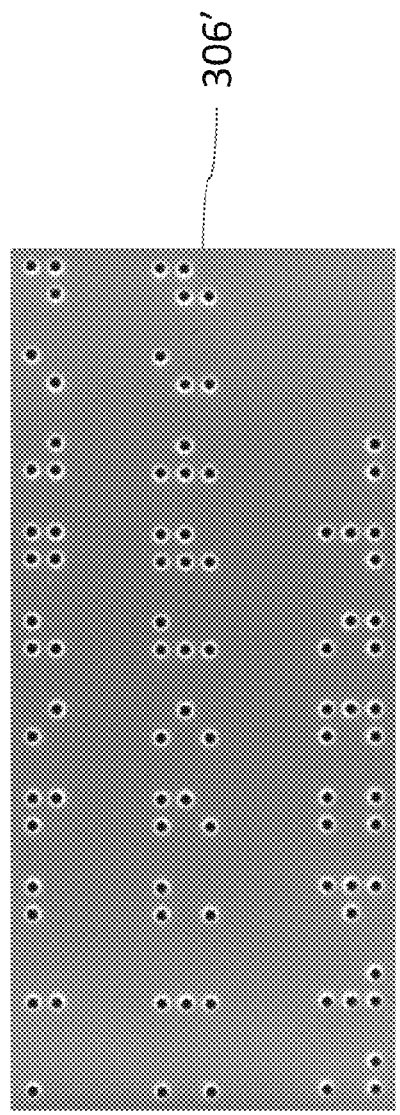
FIG. 3b illustrates an image of the portion of the back side of the card in FIG. 3a when the card is illuminated by the first light source, according to one embodiment.

In one embodiment, the characters 107 can include embossed Braille characters. FIG. 3a illustrates an image 306 of the front surface of the card 106 captured by the camera 101 when the raised Braille characters are illuminated by the first light source 105. FIG. 3b illustrates an image 306' of the back surface of the card 106 captured by the camera 101 when the recessed Braille characters are illuminated by the first light source 105. In FIGS. 3a-b, the perimeter of the Braille characters is brighter than the inner portion of the characters that is defined or surrounded by the perimeter when the Braille characters are illuminated by the first light source 105.

Figure 4A:
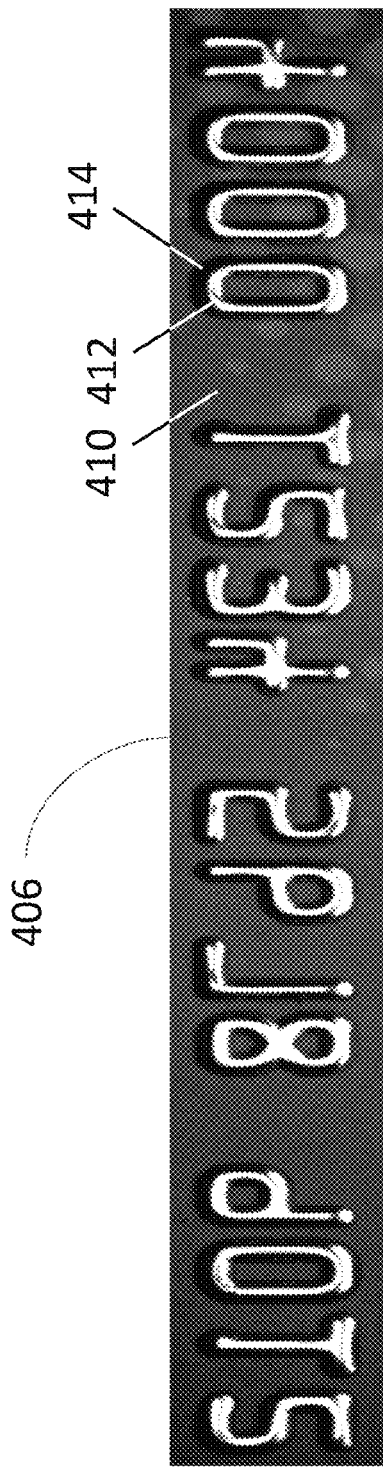
FIG. 4a illustrates an image of a portion of the front side of a card with embossed characters when the card is illuminated by a second light source, according to one embodiment.

The card 106 can also be illuminated by the second light source 109 shown in FIG. 1a. FIG. 4a illustrates an image 406 of the portion of the front surface 106a of the card 106 captured by the camera 101 when the front surface 106a faces the mirror 102 and the characters 107 on the front surface 106a are illuminated by the second light source 109. The light from the second light source 109 is reflected by the beam splitter 103, and illuminates the front surface of the card 106 in a direction generally perpendicular to the surfaces 106a-b of the card 106, or a direction generally opposite the X axis. The inner portion or top surface of the raised characters 107 has a specular reflection of the incident light and the reflected light can transmit back generally along the X axis through the beam splitter 103, is reflected by the mirror 102, and collected by the camera 101. In one embodiment, the embossed characters can have a topping layer including colorant material(s) that provides a specular-reflection surface. The perimeter of the raised characters 107 with the die angle (e.g., about 32°) may not reflect the incident light back in the perpendicular direction along the X axis and the reflected light may not be collected by the camera 101. Thus, the inner portion or top surface of the raised characters 107 appears brighter than the perimeter of the characters 107. The background or the remaining portion of the front surface 106a of the card 106 diffuses the incident light and also appears darker than the inner portion of the raised characters.

As shown in FIG. 4a, the image 406 includes a portion 410 that corresponds to the background on the front surface 106a of the card 106, a portion 414 that corresponds to the perimeter of the raised characters 107, and a portion 412 that corresponds to an inner portion or top surface of the raised characters 107 surrounded by the perimeter. The portion 414 corresponding to the perimeter is darker than the portion 412 corresponding to the inner portion or top surface of the raised characters. A strong contrast is formed between the portion 412 and the portion 414, which well defines an image of the raised characters on the front surface of the card 106.

Figure 4B:
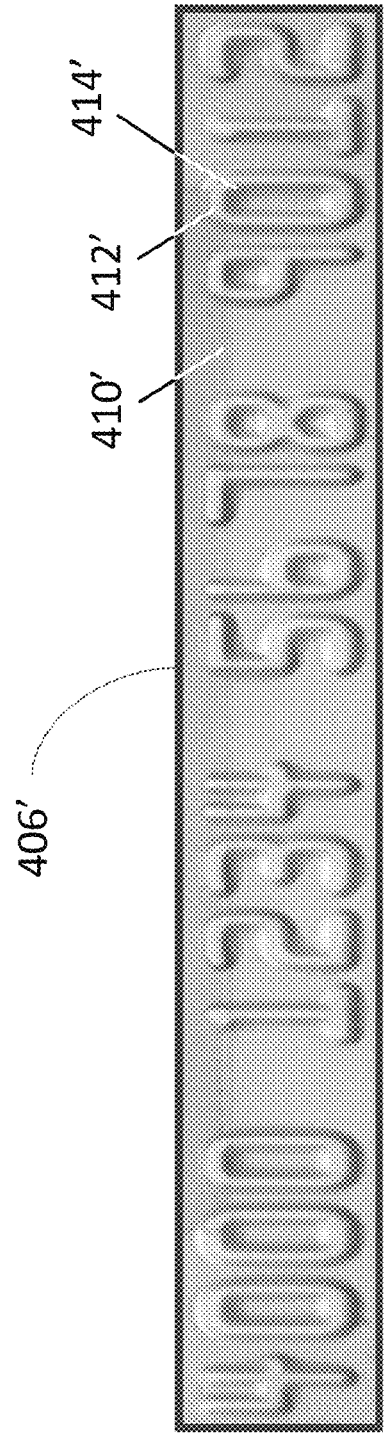
FIG. 4b illustrates an image of the portion of the back side of the card in FIG. 4a with embossed characters when the card is illuminated by the second light source, according to one embodiment.

FIG. 4b illustrates an image 406' of a portion of the back surface 106b of the card 106 captured by the camera 101 when the back surface 106b faces the mirror 102 and the characters 107 on the back surface 106b are illuminated by the second light source 109. The image 406' includes a portion 410' that corresponds to the background on the back surface 106b of the card 106, a portion 414' that corresponds to the perimeter of the recessed characters 107, and a portion 412' that corresponds to an inner portion or bottom surface of the raised characters 107 surrounded by the perimeter. The portion 414' corresponding to the perimeter is much darker than the portion 412' corresponding to the inner portion or bottom surface of the recessed characters. A strong contrast is formed between the portion 412' and the portion 414', which can define an image of the recessed characters 107 on the back surface of the card 106.

As shown in FIGS. 2a and 4a, the images 206 and 406 are captured when the portion of the front surface 106a of the card 106 is illuminated by the first light source 105 and the second light source 109, respectively. The captured images 206 and 406 of the characters 107 are complementary with each other. That is, the perimeter of the characters is brighter than the inner portion of the characters in the image 206, while the perimeter of the characters is darker than the inner portion of the characters in the image 406.

As shown in FIGS. 2b and 4b, the images 206' and 406' are captured when the portion of the back surface 106b of the card 106 is illuminated by the first light source 105 and the second light source 109, respectively. The captured images 206' and 406' of the characters 107 are complementary with each other. That is, the perimeter of the characters is brighter than the inner portion of the characters in the image 206', while the perimeter of the characters is darker than the inner portion of the character in the image 406'.

In one embodiment, up to six images can be captured by utilizing the first and second light sources 105, 109 independently or simultaneously for illuminating the characters 107 on the front and back surface of the card 106. The front surface 106a of the card 106 can be illuminated respectively by the first light source 105, the second light source 109, and simultaneously by the first and second light sources 105, 109, and three images can be captured accordingly. The card 106 then can be flipped and three images can be captured for the back surface 106b in the same manner.

In one embodiment, the three images for the front surface of the card 106 can be combined as a mixture and analyzed by an analysis tool to verify the characters.

In one embodiment, the three images for the back surface of the card 106 can be combined as a mixture and analyzed by an analysis tool to verify the characters.

It is to be understood that images of the card 106 can be taken by any sequences and/or in any combinations. The captured images are then analyzed as a mixture of combinations to verify the characters 107. This provides the ability to analyze any combination of the images in order to reach a desired threshold of confidence that the character(s) is what is expected. The desired threshold can be set at a value of 0 to 100. The higher the value of the threshold, the higher the confidence level is in the verification of the character(s). There can be a global threshold setting for scoring combination of images and there can be individual image threshold settings or a combination of global and individual threshold settings.

Figure 5:
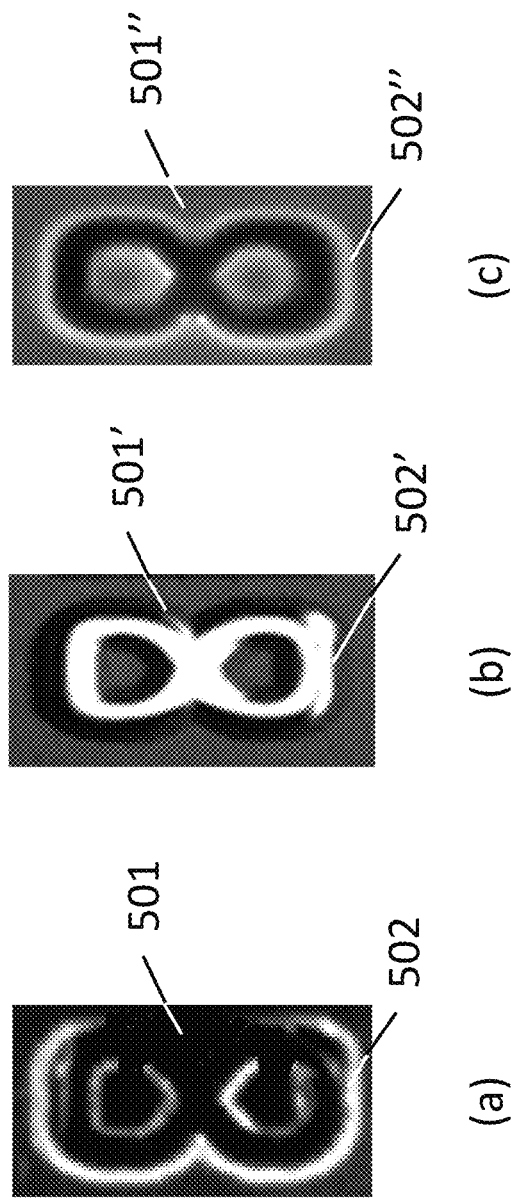
FIG. 5 illustrates a combination of three images (a), (b) and (c) used for verification.

FIG. 5 illustrates a combination of three images (a), (b) and (c) that is used for verification. The three images (a), (b) and (c) are taken from FIGS. 2a, 4 and 2b, respectively. The three images (a), (b) and (c) are the images of the same character "8" on the card 106. Portions 501, 501' and 501" of the images (a), (b) and (c) correspond to a side portion of the character "8". Portions 502, 502' and 502" correspond to a bottom portion of the character "8". In the image (a), the portion 501 shows a non-recognizable contrast difference on the perimeter of the character, and the portion 502 shows a recognizable contrast difference on the perimeter of the character. The image (a) may be misread as a character "3" by a user or a software analysis tool. In the image (b), the portion 501' shows a recognizable contrast difference on the perimeter of the character, and the portion 502' shows a non-recognizable contrast difference on the perimeter of the character. The images (a) and (b) can be combined to verify the character "8". In the image (c), both the portions 501" and 502" show recognizable contrast difference on the perimeter of the character. The image (c) can be used along with the images (a) and (b) to confirm the verification and improve the confidence level.

Figure 6:
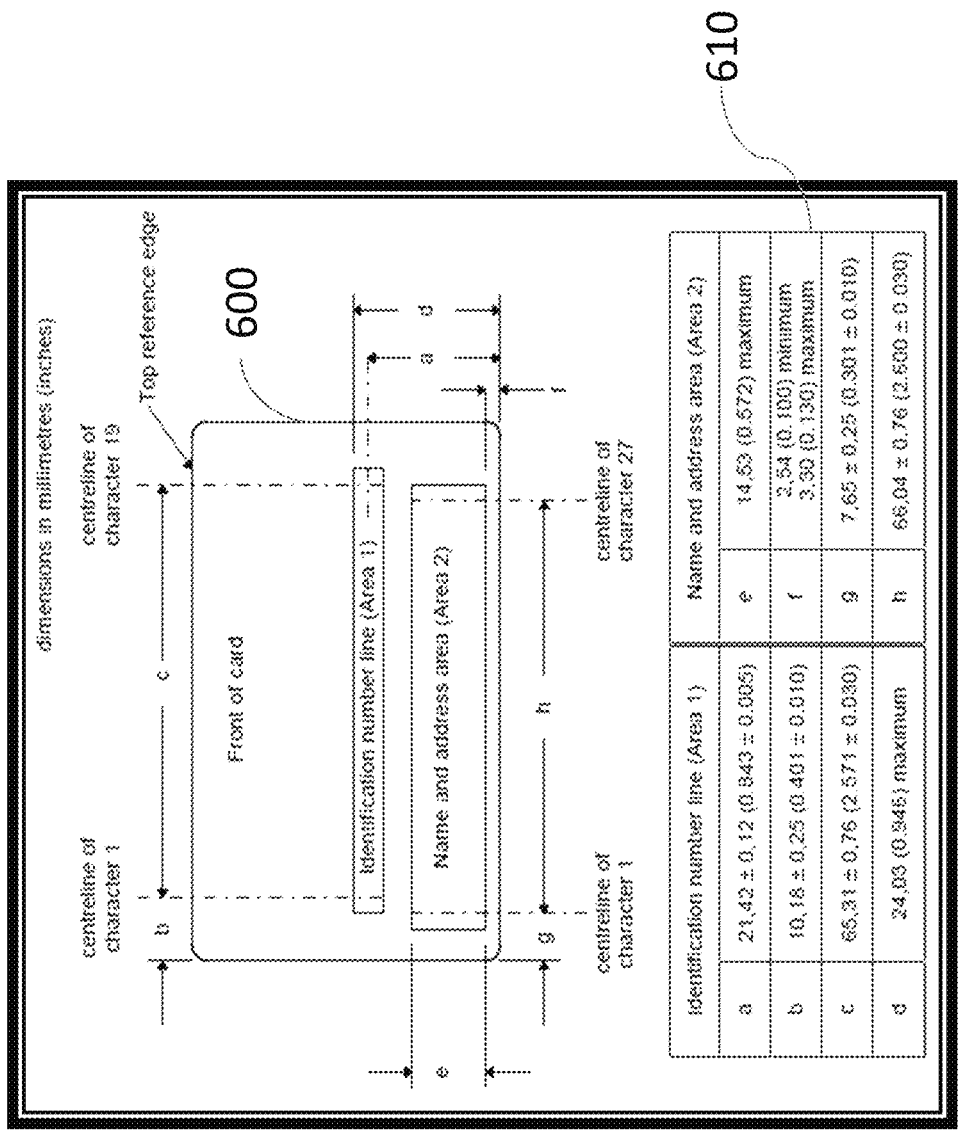
FIG. 6 illustrates how to determine and analyze location and/or spacing of characters on a card to determine whether the characters meet the ISO 7811-1 standard

Images of a personalized document described herein, such as, for example, the images shown in FIGS. 2a, 2b, 3a, 3b, 4a and 4b can be used to determine and analyze location and spacing of the characters to tell whether the characters meet standards. In one embodiment, a character location analysis can be performed by, for example, finding the center of each character in relationship to a left edge and a bottom edge of the card. FIG. 6 illustrates how to determine and analyze location of characters on a card to determine whether the characters meet the ISO 7811-1 standard. An image 600 of the front side of the card includes an area 1 for an identification number line and an area 2 for a name and address area. The location of the characters in the area 1 and the area 2 can be determined and compared with requirements 610 of location and tolerances in the ISO 7811-1 standard. The character spacing analysis can be performed by, for example, finding the center of each character in relationship to neighboring characters in the area 1 and the area 2. A character spacing for 10 CPI can be, for example, about 2.54±0.15 mm. A characters spacing for 7 CPI can be, for example, about 3.63±0.15 mm.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

The invention claimed is:

1. A vision verification system for directly reading and verifying a character on a surface of a personalized document, comprising:
    a ring-shaped first light source that surrounds the personalized document and that emits grazing incident light that is incident onto the surface including the character to illuminate the surface including the character, the ring-shaped first light source defines a first plane;
    a second light source that emits light that is directed onto the surface including the character to illuminate the surface including the character in a direction generally perpendicular to the surface of the personalized document, the second light source defines a second plane;
    the first plane is substantially perpendicular to the second plane, and the light emitted by the second light source is emitted in a direction substantially parallel to the first plane;
    a camera configured to capture an image of the character on the surface of the personalized document, the camera having an optical axis that is parallel to the surface;
    a mirror that is positioned to direct the light from the first and second light sources that is reflected from the surface including the character to the camera;
    wherein during use of the vision verification system, the ring-shaped first light source is positioned closer to the personalized document than it is to the camera; and
    wherein the ring-shaped first light source and the second light source are disposed with respect to the personalized document so that only light reflected from the surface and the character of the personalized document in a direction generally perpendicular to the surface thereof is collected by the camera, and that the captured image provides a contrast between the perimeter of the character and an inner portion of the character defined by the perimeter.

2. The vision verification system of claim 1, wherein the light emitted from the ring-shaped first light source forms an angle of from about 0 degrees to about 45 degrees with respect to the first plane.

3. The vision verification system of claim 1, further comprising a box, wherein the ring-shaped first light source is mounted at a first side of the box adjacent to the personalized document, and the camera is mounted at an opposite side of the box to detect the reflected light from the surface including the character.

4. The vision verification system of claim 1, wherein the ring-shaped first light source includes a plurality of light-emitting diodes (LEDs) that are disposed in the ring shape.

5. The vision verification system of claim 1, wherein a diameter of the ring-shaped first light source is larger than a size of the personalized document.

6. The vision verification system of claim 1, wherein incident light from the second light source transmits through a hole defined by the ring-shaped first light source to illuminate the surface including the character.

7. The vision verification system of claim 1, further comprising a beam splitter that is positioned such that the incident light from the second light source is reflected by the beam splitter to illuminate the surface including the character.

8. The vision verification system of claim 7, wherein the beam splitter is semitransparent and disposed between the personalized document and the camera so that the reflected light from the surface including the character passes through the beam splitter to be collected by the camera.

9. The vision verification system of claim 1, wherein the character comprises an embossed character.

10. The vision verification system of claim 1, wherein the document is a plastic card.

* * * * *